United States Patent [19]

Schneider

[11] 4,197,787
[45] Apr. 15, 1980

[54] PUMP PISTON WITH FLEXIBLE MEMBER

[75] Inventor: William E. Schneider, Annapolis, Md.

[73] Assignee: The United States of America as represented by the Secretary of the Navy, Washington, D.C.

[21] Appl. No.: 828,569

[22] Filed: Aug. 29, 1977

[51] Int. Cl.² .............................................. F16J 1/10
[52] U.S. Cl. ...................................... 92/129; 92/137; 92/170; 403/150
[58] Field of Search ................. 92/187, 167, 129, 137, 92/208, 170; 403/150, 152

[56] References Cited

U.S. PATENT DOCUMENTS

| | | | |
|---|---|---|---|
| 1,888,093 | 11/1932 | Peterson | 92/129 X |
| 2,179,354 | 11/1939 | Scott | 92/129 X |
| 2,188,859 | 1/1940 | Edwards | 92/129 |
| 2,844,103 | 7/1958 | Bennett | 92/129 X |
| 3,211,108 | 10/1965 | Mandorf, Jr. et al. | 417/DIG. 1 |
| 3,828,657 | 8/1974 | Neuman | 91/488 |
| 3,927,605 | 12/1975 | Siczek | 92/137 X |

FOREIGN PATENT DOCUMENTS 113709 4/1945 Sweden ........................................ 92/208

OTHER PUBLICATIONS

NASA Tech. Brief, "Mechanical Coupling for High Cyclic Loading," published Jun. 1973.

*Primary Examiner*—Irwin C. Cohen
*Attorney, Agent, or Firm*—R. S. Sciascia; Q. E. Hodges

[57] ABSTRACT

The invention is a new linkage for connecting the piston and the piston actuator in a high pressure pump. All of the compression forces transmitted from the piston actuator to the piston by this linkage will be axial forces parallel to the axis of the piston since the linkage will not transmit forces to the piston which are transverse to its axis. This linkage allows the use of hard brittle materials such as ceramic materials in the piston because any misalignment between the axises of the piston actuator and the piston will not result in bending forces being applied to the piston which would cause it to break.

1 Claim, 2 Drawing Figures

PUMP PISTON WITH FLEXIBLE MEMBER

The invention described herein may be manufactured and used by or for the Government of the United States of America for governmental purposes without the payment of any royalties thereon or therefor.

BACKGROUND OF THE INVENTION

This invention relates to high pressure pumps and in particular to mechanical linkages connecting the pistons and the piston actuators used in dewatering pumps for deep ocean vehicles and equipment. Such pumps must be able to operate in silt laden salt water and must be able to generate the high pressures which are required to pump this water out of deeply submerged vehicles. The prior art method of fabricating pistons for such pumps is to machine a core from stainless steel and to plasma spray a ceramic coating over this core. The steel core provides the required structural strength for the piston and the ceramic coating provides the required wear resistance. The high difference between the coefficients of thermal expansion of the steel core and the ceramic coating tends to cause the ceramic to chip. Quite often such pistons are used with cylinders which have ceramic linings. The high thermal expansion rate of the stainless steel core of the piston relative to the thermal expansion rate of the ceramic cylinder lining can cause the piston to seize in the cylinder since the clearence between the piston and its lining is extremely small. Any thermal expansion of the stainless steel core of the piston which is not accompanied by an equivalent expansion of the cylinder and its lining will decrease the small clearence and promote siezing. An inner layer of nickel is usually deposited on the stainless steel core of the piston to promote a good mechanical bond between the steel and the ceramic. The ceramic material is then embedded in the nickel. In time, the corrosive sea water attacks the nickel and weakens the bond holding the ceramic in place. Eventually this weakening will cause large pieces of ceramic to break off the piston.

These problems with the prior art pistons could be avoided if a solid ceramic piston were used instead of a ceramic coated steel piston. Such solid ceramic pistons would have a greatly increased life time over the prior art pistons because the bond between the ceramic and the steel tends to fail long before the ceramic itself is worn out of tolerance.

A solid ceramic piston will not break easily when it is subjected only to tension or compression forces along the main axis of the piston. However, since ceramic materials tend to be very brittle, the solid ceramic pistons can be easily broken by bending forces applied transversely to their main axises. Such bending forces on the piston are difficult to avoid because it is difficult to align the pistons actuators in such a way that the actuator moves along exactly the same axis as does the piston. Two types of piston actuator misalignment are possible. The axis along which the piston moves and the axis along which the piston actuator moves may be parallel to each other but nevertheless misaligned because they are offset from each other. The piston and the piston actuator may also be misaligned if the axis along which the piston actuator moves is not parallel to the axis along which the piston moves. The inventors have found that this type of nonparallel misalignment is easier to avoid when fabricating a pump than is the other type of misalignment where the two axises are parallel but offset from each other. A linkage is needed to connect a piston actuator with a solid ceramic piston in such a way that no significant bending forces will be applied to the piston even though the actuator and the piston move along axises which are parallel but slightly offset from each other.

OBJECTS OF THE INVENTION

It is therefore an object of this invention to provide a connecting linkage between a piston and a piston actuator in a high pressure pump which will prevent bending forces from being applied to the piston when the piston and the piston actuator are misaligned with each other.

It is another object of this invention to provide a connecting linkage between piston and piston actuator of a high pressure pump which will transmit forces to and from the piston in such a way that it will be practical to make the piston entirely of hard brittle materials such as ceramic materials.

It is a further object of this invention to increase the reliability and the operating life time of high pressured dewatering pumps used in deep ocean vehicles and equipment.

SUMMARY OF THE INVENTION

This invention is a new connecting linkage for use between the piston actuator and the piston of a high pressure pump. This linkage includes a rigid hollowed cylindrical member which is attached to the piston actuator and extends toward the ends of the piston. Mounted inside of this cylinder is a second member which is made of a relatively flexible material and is attached at one end to the piston actuator and at the other end to the piston. The end of the flexible member which is attached to the piston has a shoulder which rests against the end of the hollow cylindrical member which extends toward the piston. All of the compression forces between the piston actuator and the piston are transmitted through the hollow cylindrical member to this shoulder and from the shoulder through the end of the flexible member to the piston. All of the tension forces between the piston actuator and the piston are transmitted directly through the flexible member. Because the shoulder of the flexible member is not rigidly attached to the hollow cylindrical member but only in contact with it, no bending forces will be applied to the piston as a result of the piston actuator and the piston being misaligned.

DESCRIPTION OF THE PREFERRED EMBODIMENT

Figure 2:
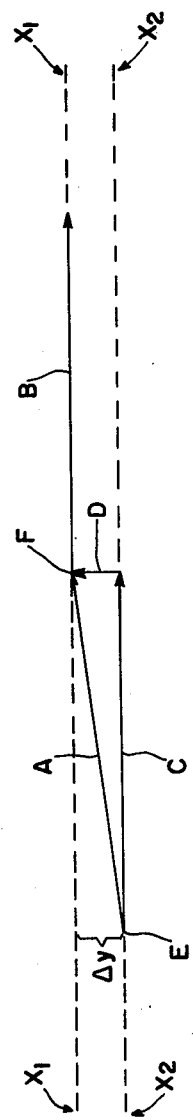
FIG. 2 is a vector diagram illustrating the forces which are applied to the end of the piston by the piston actuator.

FIG. 2 illustrates how a prior art linkage applies bending forces to the end of the piston when the piston and the piston actuator are not perfectly aligned. The dashed line $X_1$ is the axis along which the piston moves and the dashed line $X_2$ is the axis along which the piston actuator moves. The $X_1$ axis is parallel to $X_2$ axis displaced by a distance $\Delta Y$. The piston actuator will apply forces to the connecting linkage at a point E and the connecting linkage will apply forces to the piston at point F. If A is a vector representing the force applied by the piston actuator through the linkage to the piston, then the vector C is the component of that force which is parallel to the axis of the piston and the piston actuator and the vector D is the component of that force which is perpendicular or transverse the axises of the piston and the piston actuator. The forces which are actually applied to the end of the piston at point F will be the vector B, which is the same as the vector C and is axial to the piston, and the vector D which will be a bending force tending to break the piston.

Figure 1:
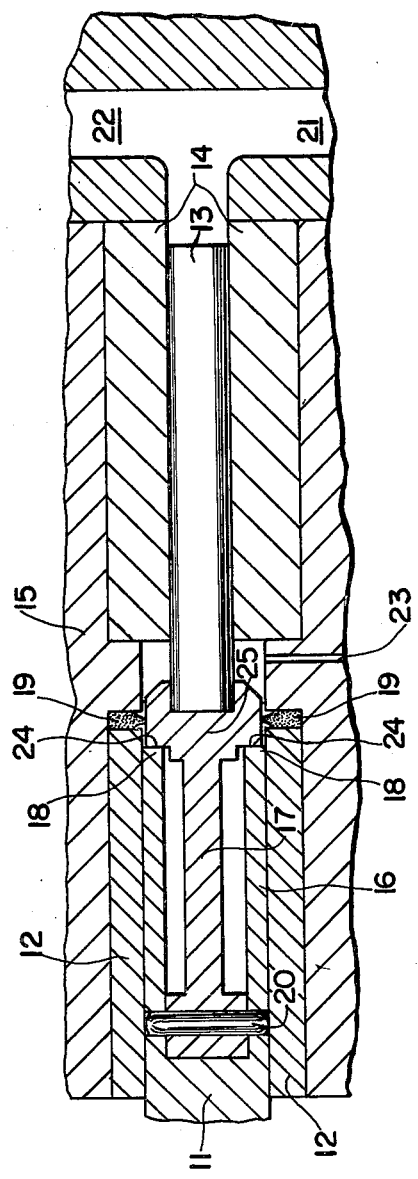
FIG. 1 is a cross sectional view of a high pressure pump which includes the preferred embodiment of the invention.

The pump shown in FIG. 1 comprises a ceramic piston 13 which reciprocates within a ceramic liner 14 which is mounted in a pump body 15. The fluid being pumped enters into the cylinders through a valve in channel 21 and exits from the cylinder to a valve in channel 22. The piston actuator 11 and the guide bushing 12 are made of a metal such as steel or bronze. A hollow cylindrical extension of the piston actuator 16 may also be made of steel or other suitable material. This extension may be formed by boring into the end of the actuator or by attaching a cylinder to the actuator. An elongate flexible member 17 is mounted relatively loosely by means of pin 20 inside of the hollow cylindrical extension 16 from the end of the piston actuator. At the contact surface 18 the end of this hollow cylindrical extension rests against a shoulder 24 of the flexible member 17 but is not attached to the shoulder. Leakage port 23 drains away any of the pumped fluid which may leak past the piston. Seal 19 prevents any of this fluid from mixing with the lubricating oil which covers the guide bushing 12, piston actuator 11, and piston actuator extension 16. The flexible member 17 is made from a metal such as titanium that has a good resistance to sea water corrosion and a relatively low modulus of elasticity. The lower the modulus of elasticity of the flexible member, the less stiff the member will be and the lower will be the amount of bending forces applied to the piston 13. Whenever a tension force is transmitted between the actuator 11 and the piston 13, the force is transmitted entirely by way of the flexible member 17, and not by way of the actuator extension 16 because the flexible member 17 and the actuator extension 16 are not attached to each other at contact surface 18. However, when the forces between the pistons 13 and the actuator 11 are compression forces, most of these compression forces will be transmitted from the piston 13 to the head 25 of the flexible member 17 and then through the contact surface 18 to the actuator extension 16 of the actuator. When such a compression force is first applied, the head 25 of the flexible member 17 will be able to move about the floating contact surface 18 in such a way no transverse or bending forces will be applied to the piston. No bending forces could possibly be applied to the piston through the contact area 18 when tension forces are applied between the piston and piston actuator since the tension forces will pull the shoulder 24 apart from the actuator extension 16. As long as the piston actuator and the piston are moving along parallel axises which are displaced by a fixed distance, the position of the shoulder 24 relative to the position of the end of the actuator extension 16 will also remain fixed whenever a compression force is applied between them. Because the compression forces produced by the piston actuator are in a direction which is parallel to the axis of movement of the piston and because the compression forces will not tend to move the position of the shoulder 24 with respect to the position of the end of the actuator extension 16, no bending forces will be placed on the piston by the piston actuator. The seal 19 is used to separate the lubricating oil which surrounds the piston actuator 11, the actuator 16 and the flexible member 17, from the fluid which leaks from the cylinder past the piston. The leakage fluid drains out the exit port 23. When a pump of this kind is in actual use in a deep submerged vehicle, the entire pump is submerged in the body of seawater with which leakage port 23 communicates. The pressure of the lubricating oil is maintained at approximately the same pressure as this body of water.

The advantage of this invention over the prior art is that it allows hard brittle materials such as ceramic materials to be used for both the piston and the piston liner of a pump for pumping corrosive abrasive fluids such as seawater. Hard non-corrosive materials such as ceramics cannot be used in applications where they may be subjected to high bending stresses. This invention removes most of the bending forces from the piston made of such a hard brittle material. This reduction of bending or side loading forces also reduces the rubbing wear between the reciprocating piston and its stationary liner because the piston is subjected to an almost pure axial loading. This reduction in rubbing wear should increase the operating life of the piston and liner over the old designs.

Other hard non-corrosive brittle materials may be used to construct the piston. Likewise, any suitable metal other than titanium may be used to construct the flexible member of the linkage. Obviously many modifications and variations of this invention are possible in light of the above teachings. It is therefore to be understood that within the scope of the appended claims the invention may be practiced otherwise than as specifically described.

What is claimed is:

1. A high pressure pump for handling corrosive liquids comprising:
    a cylinder formed of ceramic material;
    a piston, also formed of ceramic material and subject to breakage by the application of bending forces, located within the cylinder and adapted to be reciprocated therein for moving said liquids;
    an actuator spaced from the piston and adapted to reciprocate along an axis generally coaxial with the cylinder axis for moving the piston;
    means connecting the actuator and piston;
    said connecting means including an elongate laterally flexible member disposed between the actuator and piston and terminating at one end in a head, means securing said head to the piston and which head includes radially directed shoulder means facing the actuator, and means mounting said flexible member to said actuator;
    said connecting means also including a hollow cylindrical portion extending from the actuator and coextensively surrounding the elongate flexible member and terminating at one end in a radially directed surface adjacent the facing shoulder for abutment thereagainst;
    whereby substantially only tension forces are exerted in an axial direction on the piston by the elongate flexible member when the actuator moves in one direction and substantially only compressive forces are exerted in an axial direction on the piston by the cylindrical portion abutting against the shoulder means when the actuator moves in the other direction even when the axes of the cylinder and actuator movement are slightly misaligned from said general coaxial relationship.

* * * * *